(12) United States Patent
Abuelsaad et al.

(10) Patent No.: US 10,146,934 B2
(45) Date of Patent: Dec. 4, 2018

(54) SECURITY INFORMATION SHARING BETWEEN APPLICATIONS

(71) Applicant: International Business Machines Corporation, Armonk, NY (US)

(72) Inventors: Tamer E. Abuelsaad, Somers, NY (US); Carlos A. Hoyos, Brooklyn, NY (US); Nader M. Nassar, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 302 days.

(21) Appl. No.: 14/211,141

(22) Filed: Mar. 14, 2014

(65) Prior Publication Data

US 2015/0261951 A1  Sep. 17, 2015

(51) Int. Cl.
*G06F 21/00* (2013.01)
*G06F 21/52* (2013.01)
*G06F 21/55* (2013.01)

(52) U.S. Cl.
CPC ............ *G06F 21/52* (2013.01); *G06F 21/554* (2013.01)

(58) Field of Classification Search
CPC ....................................................... G06F 21/54
See application file for complete search history.

(56) References Cited

U.S. PATENT DOCUMENTS

| | | | |
|---|---|---|---|
| 8,353,033 B1* | 1/2013 | Chen ........................ | G06F 21/51 713/164 |
| 2008/0221944 A1 | 9/2008 | Kelly et al. | |
| 2009/0077383 A1* | 3/2009 | de Monseignat ... | H04L 63/0823 713/175 |
| 2009/0319771 A1 | 12/2009 | Nagaraja | |
| 2010/0156628 A1 | 6/2010 | Ainsbury et al. | |
| 2010/0156630 A1 | 6/2010 | Ainsbury | |

(Continued)

FOREIGN PATENT DOCUMENTS

| | | |
|---|---|---|
| JP | 2002-132902 A | 5/2002 |
| JP | 2008-171255 A | 7/2008 |
| WO | 2006/125274 A1 | 11/2006 |

OTHER PUBLICATIONS

Balzer, Robert. "Assuring the safety of opening email attachments." DARPA Information Survivability Conference; Exposition II, 2001. DISCEX'01. Proceedings. vol. 2. IEEE, 2001.*

(Continued)

*Primary Examiner* — Mahfuzur Rahman
(74) *Attorney, Agent, or Firm* — Scully, Scott, Murphy & Presser, PC; Kurt P. Goudy, Esq.

(57) ABSTRACT

A system and method for sharing data and a risk assessment of the data comprises receiving data in a first application and obtaining a risk level of the data, performing an action in the first application necessitating passing a message comprising at least the data and the risk level to a second application, passing the message from the first application to the second application, receiving, at the second application, the message, determining by said second application whether the risk level exceeds a predetermined threshold, when the risk level exceed the predetermined threshold, implementing a protocol to perform actions in the second application using the data in accordance with the protocol, and when the risk level does not exceed the predetermined threshold, running the second application using the data.

17 Claims, 7 Drawing Sheets

(56) References Cited

U.S. PATENT DOCUMENTS

| | | | | |
|---|---|---|---|---|
| 2010/0192224 A1* | 7/2010 | Ferri | ............... | G06F 21/53 |
| | | | | 726/23 |
| 2012/0011588 A1* | 1/2012 | Milener | ............... | G06F 21/51 |
| | | | | 726/24 |
| 2012/0144492 A1* | 6/2012 | Griffin | ............... | G06F 21/56 |
| | | | | 726/25 |
| 2014/0259158 A1* | 9/2014 | Brown | ............... | G06F 21/554 |
| | | | | 726/22 |
| 2016/0132883 A1* | 5/2016 | Evans | ............... | G06Q 20/10 |
| | | | | 705/44 |

OTHER PUBLICATIONS

Anonymous, "System for Communicating Risk with Normal Distribution", IP.com, IP.com No. IPCOM000177546D, Dec. 17, 2008, pp. 1-12.

Anonymous, "Security for Shared Data Spaces", IP.com, IP.com No. IPCOM000156657D, Jul. 30, 2007.

Perlroth, Nicole, "Outmaneuvered at Their Own Game, Antivirus Makers Struggle to Adapt", The New York Times, Dec. 31, 2012, pp. 1-4.

* cited by examiner

US 10,146,934 B2

SECURITY INFORMATION SHARING BETWEEN APPLICATIONS

BACKGROUND

The present disclosure relates generally to the field of securely sharing data between various software applications running on computing devices or systems.

There are many applications that host and/or render user data. These applications could be anything from an email client to a PDF reader. Data exchange and data sharing between these applications is common. Unfortunately, data is not always trustworthy. At some point, most applications, such as email clients, interact with sensitive data, or data that is risky and/or harmful to business continuity. Many of these applications also share data with other applications but sharing sensitive or malicious data between applications helps spread malware and reduces the security posture caused by a reduced control for this data. Some applications have sophisticated techniques that can determine if there is risk associated with the data being interacted with. However, at present that determination of risk is never passed down from one application to another. Hence, even if a sensitive or malicious piece of data is found in an email client, for example, and quarantined, the data might be passed down to a web browser, for example on the same user device, and wreak havoc.

BRIEF SUMMARY

To overcome the problems caused by sharing sensitive or malicious data between applications, a novel system and method is presented. The inventive system and method passes specific (intended) data and identified and/or detected level of risk and/or level of confidence (or other measurements) regarding this data from one application to another application. If the risk is higher than a threshold, the receiving application is programmed to run, in response to the higher risk, the operation requested with extra precautions. For example, the receiving application triggers certain modes of operations, such as sandbox mode, while interacting with the data, based on the received level of risk. In this approach, one application would not only share the intended data with another application, but also would share the level of risk known or determined regarding the data, or the level of confidence in the safety of this data. This risk analysis and sharing enables the recipient application to be alerted, and perhaps take appropriate action, if the data is deemed to be a "high" risk or malicious.

A method for sharing data and a risk assessment of the data comprises: receiving data in a first application and obtaining a risk level of the data; performing an action in the first application necessitating passing a message comprising at least the data and the risk level to a second application; passing the message from the first application to the second application; receiving, at the second application, the message; determining by said second application whether the risk level exceeds a predetermined threshold; when the risk level exceed the predetermined threshold, implementing a protocol to perform actions in the second application, said actions comprising at least using the data in accordance with the protocol; and when the risk level does not exceed the predetermined threshold, running the second application using the data, wherein a programmed processor performs one or more of performing an action in the first application, determining the risk level, performing actions in the second application, and running the second application. In one aspect, the method can be performed using a hardware processor.

In one aspect, the first application is an email client and the action is clicking a URL in a selected email message. In one aspect, performing actions in the second application comprises displaying an error message and terminating the second application. In one aspect, performing actions in the second application comprises limiting functionality of the second application and running the second application with the limited functionality. In one aspect, limiting functionality of the second application comprises disabling Java® scripts, preventing downloading, preventing caching, implementing sandbox mode, implementing paranoid mode (discussed below), and quarantining. In one aspect, the second application is a web browser, a file viewer, a word processing program, a spreadsheet program, a presentation program, or an image viewer. In one aspect, the first and second applications reside on a mobile device. In one aspect, one or both of the first and second applications reside on a distributed computing network.

A program storage device readable by a machine, tangibly embodying a program of instructions executable by the machine to perform methods described herein may be also provided.

Further features as well as the structure and operation of various embodiments are described in detail below with reference to the accompanying drawings. In the drawings, like reference numbers indicate identical or functionally similar elements.

DETAILED DESCRIPTION

Figure 1:
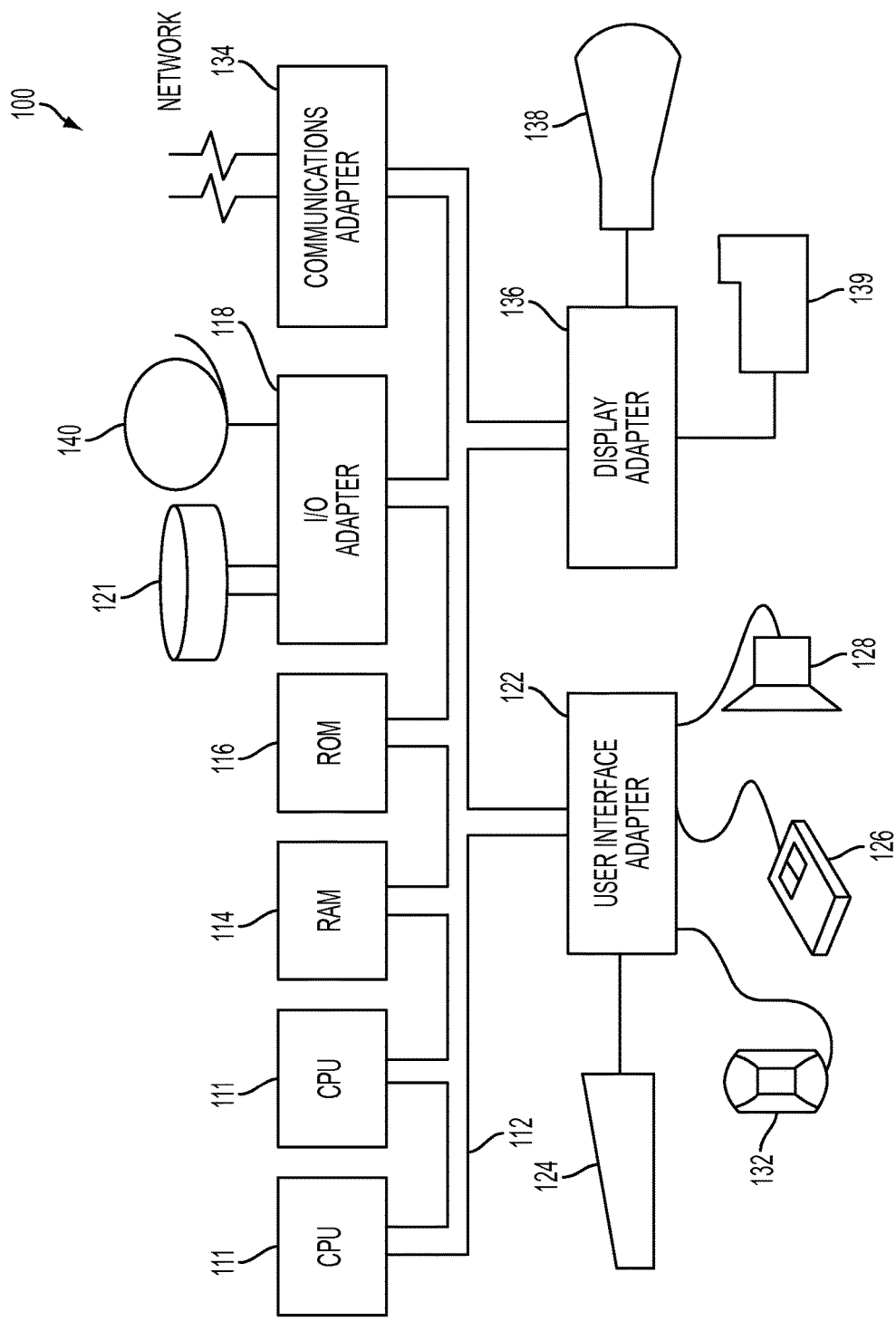
FIG. 1 is an exemplary system architecture of the present disclosure in one embodiment.

An inventive system and method for informing recipient applications about level of risk associated with incoming data, and enabling the recipient applications to modify their environments accordingly, is presented.

Applications that host and/or render data, e.g., initial applications, are becoming more and more sophisticated with regards to classification of the content of the data and security affected by the classification. Specifically, during the execution of an initial application, there could be indicators that some data or payload is suspicious, e.g. an email from someone not recognized, or an attachment that was sent to different people, or sensitive, e.g., an attachment that was downloaded from a privileged source such as a confidential repository. For example, sensitive data can be data comprising sensitive, e.g., confidential, subject matter. Examples of initial applications include, but are not limited to, email clients, word processing programs, spreadsheet programs, image viewers, various programs that accept data from users for processing, etc. For example, email clients today know when an email, opened by a user, contains spam, malware, etc. These indicators might be known by different systems, and alone may not prove that the data being sent is malicious. All of these indicators can be used to perform risk assessment, that is, to calculate a risk index or metric, that would be passed downstream to the application (or applications) receiving the data.

When a user performs an operation inside one of these initial or first applications that requires opening a second application, e.g., receiving application, and passing information and/or a specific data set based on current data to the receiving application, it is crucial for the second application to know what the first application knows about information being passed. For example, when a URL is clicked in a selected message in an email client, the email client can launch a web browser (or make the call for the computer operation system (OS) to do so) and the email client (initial application) will pass to the web browser (receiving application) the URL (data) to be opened. If the URL originated in an email message considered suspicious or confidential, it would be important for the web browser to know that.

This also applies to a user browsing a web site that the browser knows to be suspicious. For example, the user is on a mobile device and clicks a link to download a mobile application ("app"). Typically these requests are passed to a receiving application, e.g., the app store, to perform the app installation. If the app store knows that this application link (data/payload) originated from a suspicious source, then the app store might react differently or install the app in a separate container on the mobile device.

In addition, this applies to a user browsing a document repository or collaboration tool that the browser knows to have sensitive information. For example, if the user clicks to try to download and edit a document that comes from a sensitive document repository, the receiving application (e.g., a word processing software) might use the browser's knowledge and open in a restricted mode, where the user is not allowed to share changes with others, or print to certain devices.

As discussed above, a risk index or metric can be determined by the initial application to characterize the data or information, or the application's confidence in the data or information, being passed from the initial application to a receiving application. In one embodiment, if the initial application is an email client, then it can automatically determine whether or not a received email is spam, junk, malicious, etc., and a risk index can be calculated based on this determination. The risk index can be, for example, a percentage of "maliciousness", or a malicious level, such that a default 0% means "no risk" and a default 100% means "extremely risky/very likely malicious". Accordingly, if an email is determined to be spam, its risk index can be, for example, 55%, while if an email is determined to be malicious, its risk index can be, for example, 92%, as a default. In other words, malicious level can be percent of confidence in the data, that is a percent by which the initial application determines that the data is malicious.

The risk index can be used by the receiving application to choose how to handle the received data. If the risk index exceeds a predetermined threshold, specific functions can be performed. In one embodiment, the risk index can be an integer between 0 and 1 and the threshold can be 0.8. In another embodiment, the risk index can be a percentage, e.g., the percent of confidence in the data, which can be between 0% and 100%. Thus, in this embodiment, if the risk index received with the received data by the receiving application is a predetermined or default value, e.g., 92%, then the receiving application could quarantine itself by opening the received data, e.g., the attachment or link, in a "read only or protected mode" that would prevent changes to the system or access to certain data layers. This safer mode might prevent the application, and its user, from gaining access to all the functionality normally available in normal mode. Alternatively, the receiving application may open in sandbox mode, or may open in "paranoid mode" (defined below), or may not open or execute, but instead may display an error message when the risk index is above a predetermined threshold. Paranoid mode can be, for example, a mode in which detailed logging of each action is recorded by the application, or a mode which launches the application with limited or restricted functionality, such as without any file download capabilities, without caching capabilities or with Java Script disabled.

Advantageously, an application can use this metric from upstream (initial) applications to choose how, or even if, to open the received data, which provides a good balance between usability and performance. Hence, the user can have full access to files that have small risks, and also maintain security and integrity since the receiving application launches in a restricted mode that is more secure when the risk index or metric indicates such is needed. Also, the level of security sophistication, e.g., detection or malware, malicious scripts, etc., can be shared from one application with other applications that might not have such capabilities.

FIG. 1 illustrates an exemplary hardware configuration of a computing or mobile device computing system infrastructure 100 in which the present methods are run. In one aspect, computing system 100 is programmed to run one or more applications, and is programmed to perform the method processing steps of FIG. 4. The hardware configuration preferably has at least one processor or central processing unit (CPU) 111. The CPUs 111 are interconnected via a system bus 112 to a random access memory (RAM) 114, read-only memory (ROM) 116, input/output (I/O) adapter 118 (for connecting peripheral devices such as disk units 121 and tape drives 140 to the bus 112), user interface adapter 122 (for connecting a keyboard 124, mouse 126, speaker 128, disk drive device 132, and/or other user interface device to the bus 112), a communication adapter 134 for connecting the system 100 to a data processing network, the Internet, an Intranet, a local area network (LAN), etc., and a display adapter 136 for connecting the bus 112 to a display device 138 and/or printer 139 (e.g., a digital printer of the like).

Figure 2:
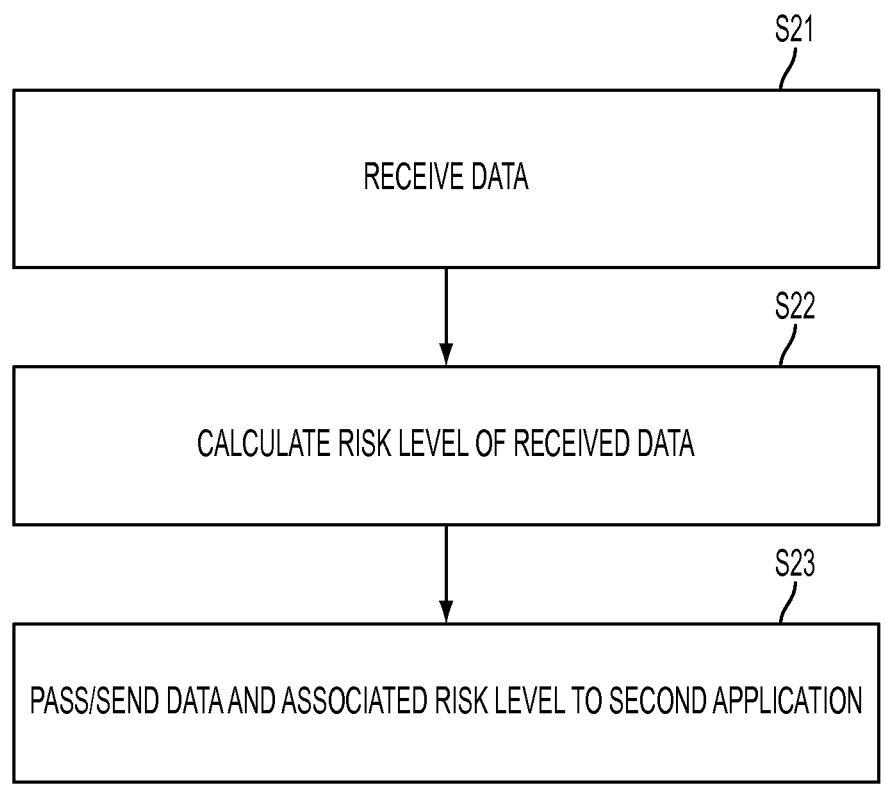
FIG. 2 is a flow diagram illustrating the flow of the initial application.

FIG. 2 is a flow diagram illustrating the first or initial application. In step S21, the initial application receives data. The initial application can receive data from user input and/or from various other sources including files having data such as word processing data, spreadsheet data, presentation data, such as PowerPoint®, Visio®, and/or images, or other forms of data to be displayed or processed. In one embodiment, the initial application is an email client and the data is received from an email server. In one embodiment, the initial application is a word processing program and the data is received from user input.

In step S22, the initial application obtains the risk level of the received data, which can be calculated by the initial application or otherwise determined based on the data. The risk level can be a percent indicating the percent of confidence the initial application has in the received data, including not only whether or not the data is malicious but also whether or not the data is sensitive. In one embodiment, the initial application is an email client and the risk level is determined in accordance with a criteria of the sender of the email and the contents of the email and attachments to the email, if any, and if the initial application determines that the received data, e.g., the email message, is likely malicious based on the criteria, the risk level can default to a predetermined or default value, e.g., 92%. In one example, if a URL is knows to be from a malicious source, then the risk level can default to a high value such as 92%. In another example, if the email is not classified by the email client as causing concern, that is, not junk or spam for example, then the risk level can default to a minimal value such as 12%. In step S23, the data and the risk level are passed to the second application via the operating system of the initial application. Typically, the data and risk level are passed from the initial application to a second application using either shared memory or Uniform Resource Identifier (URI) protocol.

Figure 3:
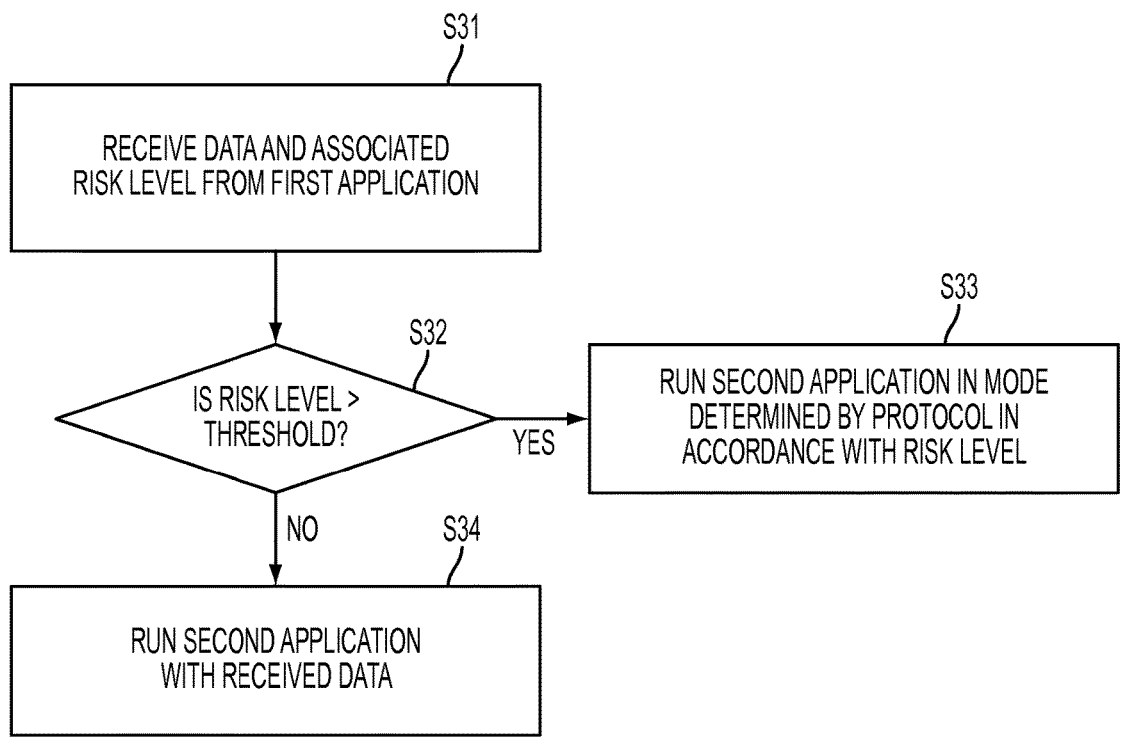
FIG. 3 is a flow diagram illustrating the flow of the second application.

FIG. 3 is a flow diagram for the second or receiving application. In step S31, the data and risk level are received from the initial application, typically via the operating system using either shared memory or URI protocol. In step S32, it is determined whether the received risk level is greater than a predetermined threshold established by the second application. If the received risk level is greater than the predetermined threshold (S32=YES), then in step S33 the second application is run in a mode determined in accordance with the risk level. Otherwise (S32=NO), in step S34 the second application is run in standard or default mode; no precautions are taken because the data is determined to have a low degree of risk, or a high level of confidence.

For example, if the receiving application is a web browser, it can consult its policy or protocol to determine what to do with a URL considered, by the initial application, to have a high risk level, such as a confidence or risk level greater than 50%. One policy could be to display an error message, such as "corrupt data", instead of displaying or otherwise processing the data. Another policy could be to quarantine the operation of the process, or to operate the process in paranoid mode.

In another embodiment, the second application may not have a policy or rules regarding risk level or confidence level of incoming or received data. In this embodiment, the actions to be taken in accordance with the risk level can be determined by a variety of methods. For example, the OS can provide not only the risk level parameter but also appropriate run-time settings for the second applications, such as preventing any file download capabilities, preventing caching capabilities and/or disabling Java Script. In another example, the OS can provide only the run-time settings and not the risk level parameter. In yet another example, a mid-level or intermediate program can interpret the risk level and provide the appropriate run-time settings to the second applications. In still another example, plug-ins can be used to interpret the risk level and provide the appropriate run-time settings to the second application.

In one embodiment, the second application is a web browser, the data is a hyperlink, and the predetermined threshold programmed in the browser policy is 50%, and if the risk level is very high, such as the exemplary 92%, then the web browser may respond by not opening the hyperlink. In the same embodiment of web browser second application, if the risk level is moderate, such as 61%, the web browser may open the hyperlink in paranoid mode. The mode in which to run the data is determined by the second application based on its protocol for handling risk. For example, the second application's protocol may be to run without extra security precautions when the received data is deemed to have minimal risk, such as a risk level between 1% and 49%, and the second application may run in paranoid mode when the received data is deemed to have medium risk, such as a risk level between 50% and 83%, and the second application may run in sandbox mode or may not run but may merely display a message when the received data is deemed to have maximum risk, such as a risk level between 84% and 99%.

Figure 4:
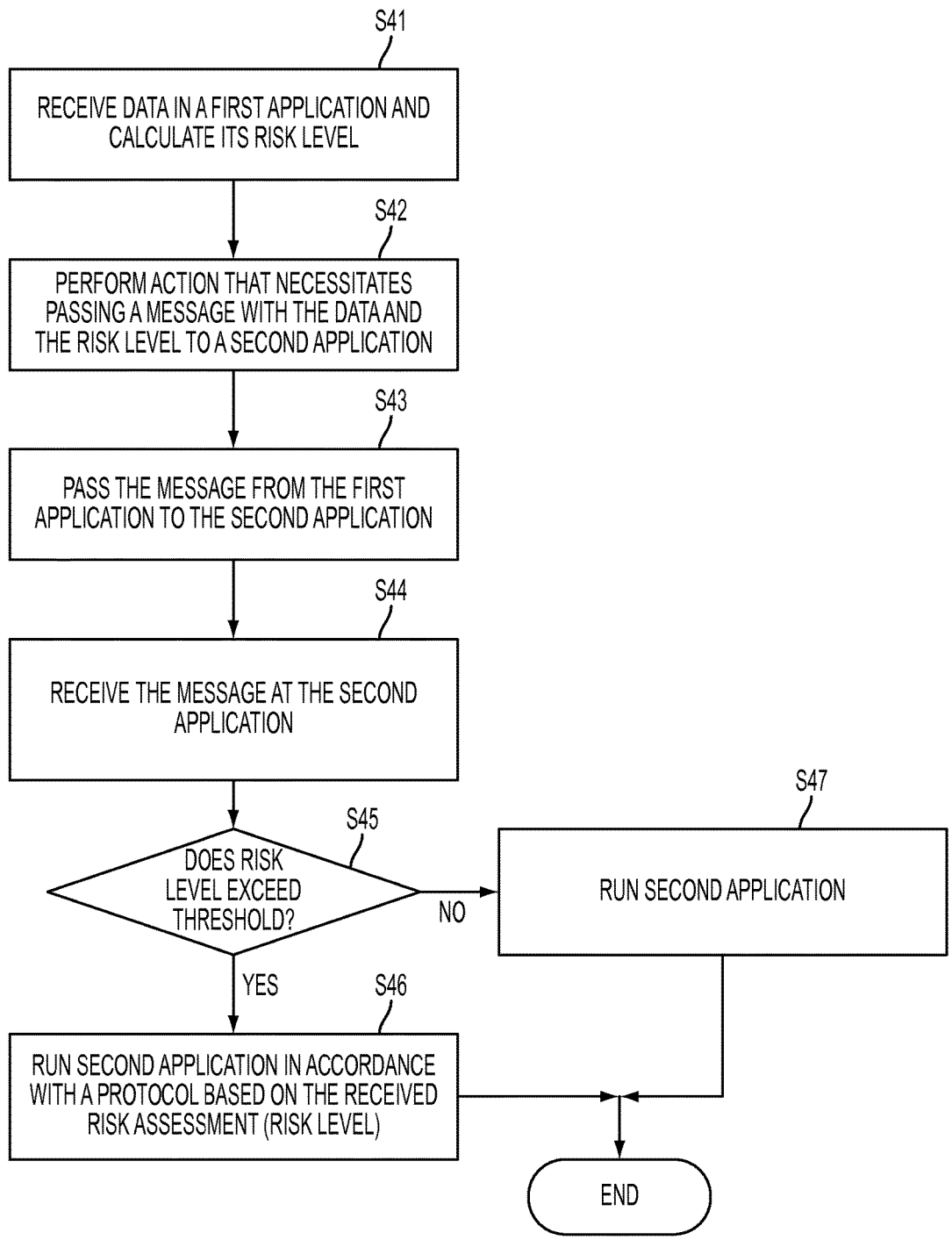
FIG. 4 is a flow diagram illustrating a method of the present disclosure in one embodiment.

FIG. 4 is a flow diagram illustrating a method of the present disclosure in one embodiment. As shown in FIG. 4, the steps of the inventive method in one embodiment are as follows. In step S41, an initial application is run on a computing system having software and hardware components. The initial application receives data and performs a risk assessment to determine the degree or amount of confidence in the reliability of the data, or whether the data poses some risk. The risk assessment can be, for example determining a risk level that quantifies the initial application's assessment of the reliability of the data. In step S42, the initial application performs an action that necessitates passing a message from the initial application to a second, receiving application. The action could be a user instruction, such as a user selecting a particular email in an email client application and clicking on a URL in the selected email, or any other instruction within the initial application that necessitates passing a message.

In step S43, the message with data and associated risk level is passed from the first application to the second application. In step S44, the second application receives the message with its data and risk level. If the second application determines that risk level exceeds a predetermined threshold (S45=YES), in step S46, the receiving application takes protective measures around its actions, such as actions discussed above. If the second application determines that the risk level does not exceed the predetermined threshold (S45=NO), the receiving application performs in its normal fashion in step S47.

In one embodiment, the method can be performed on system 100, using CPU 111 to execute the initial application in step S41. Data for step S41 can be received from the RAM 114, the ROM 116, the user interface adapter 122 and/or from the I/I adapter 118. In step S42, a user instruction can be obtained via the user interface adapter 122 and/or from the I/O adapter 118. In step S43, information can be passed via the network and/or by using the communications adapter 134. In step S45, the determination of whether the risk level is greater than the predetermined threshold can be made using the CPU 111. An error message, if appropriate in step S46, can be displayed via the display adapter 136 on the display device 138. Variations in the use of system 100 can be made as is known to one skilled in the art.

Figure 5:
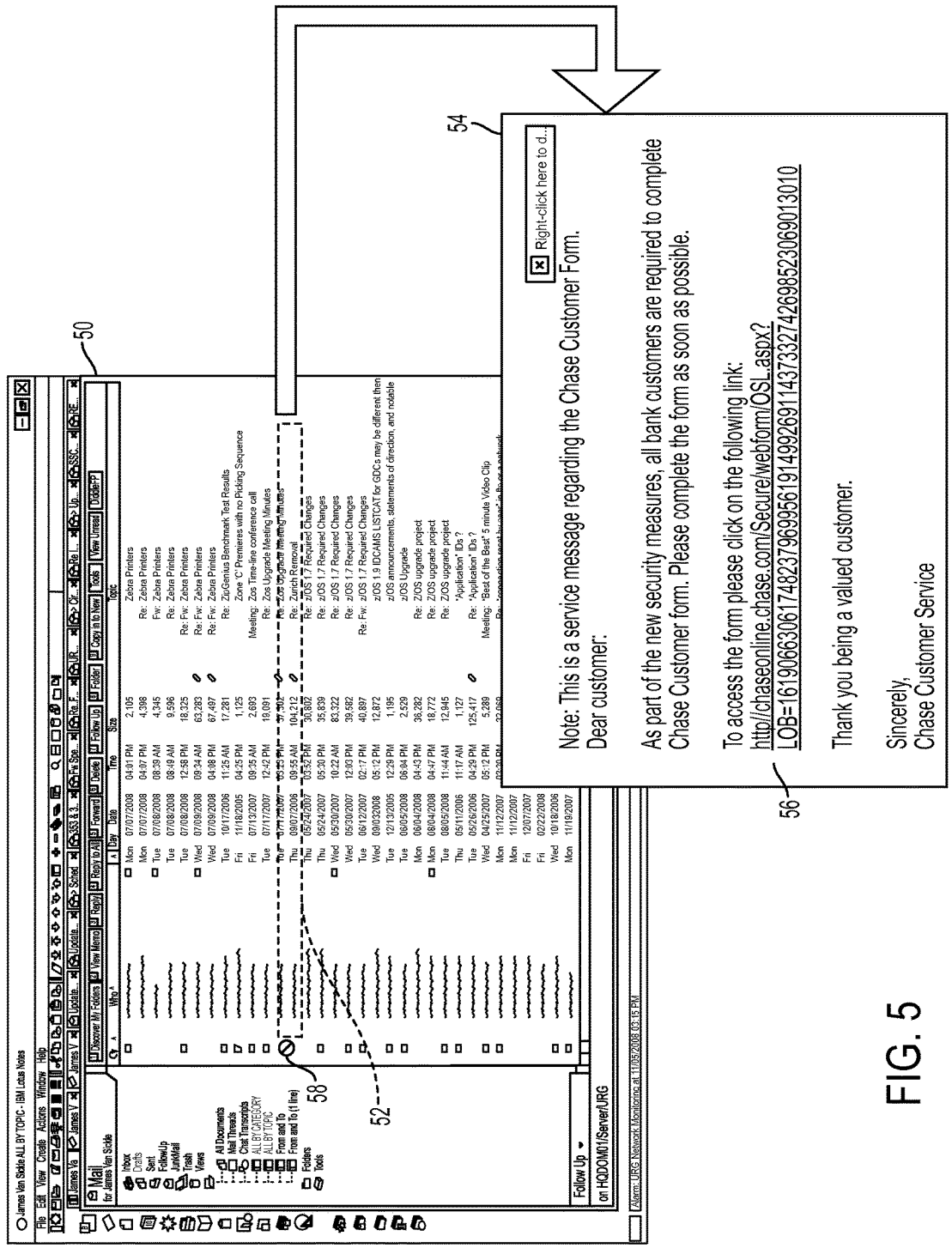
FIGS. 5-7 illustrate an embodiment in which an email client is the initial application and a web browser is the second application.
Figure 6:
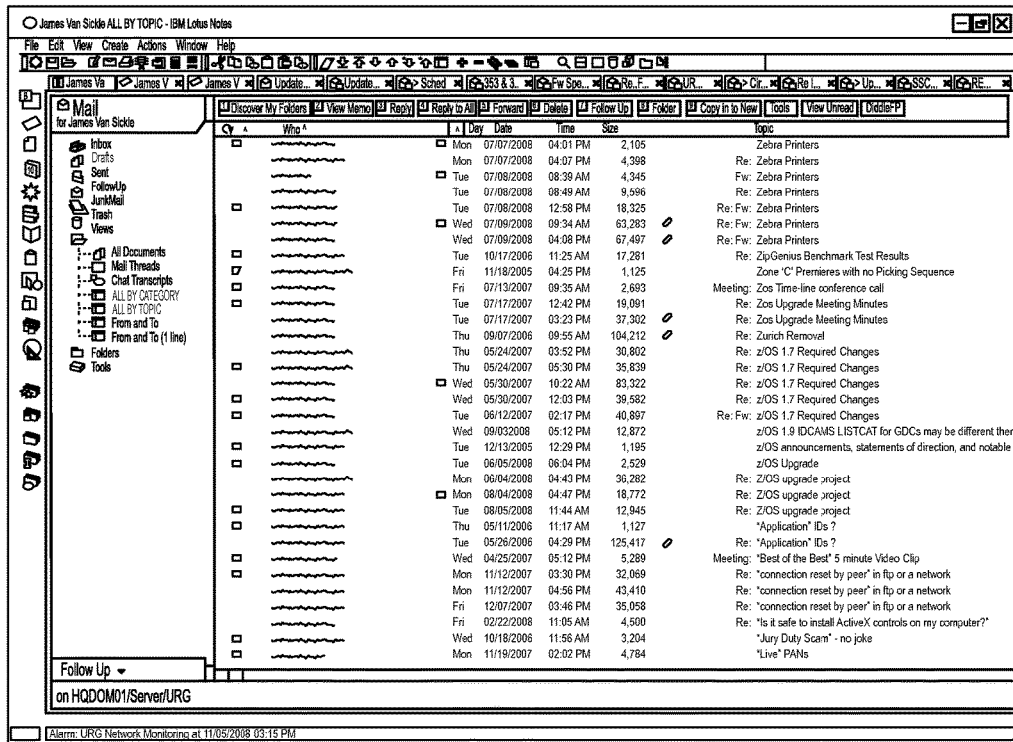
Figure 6:
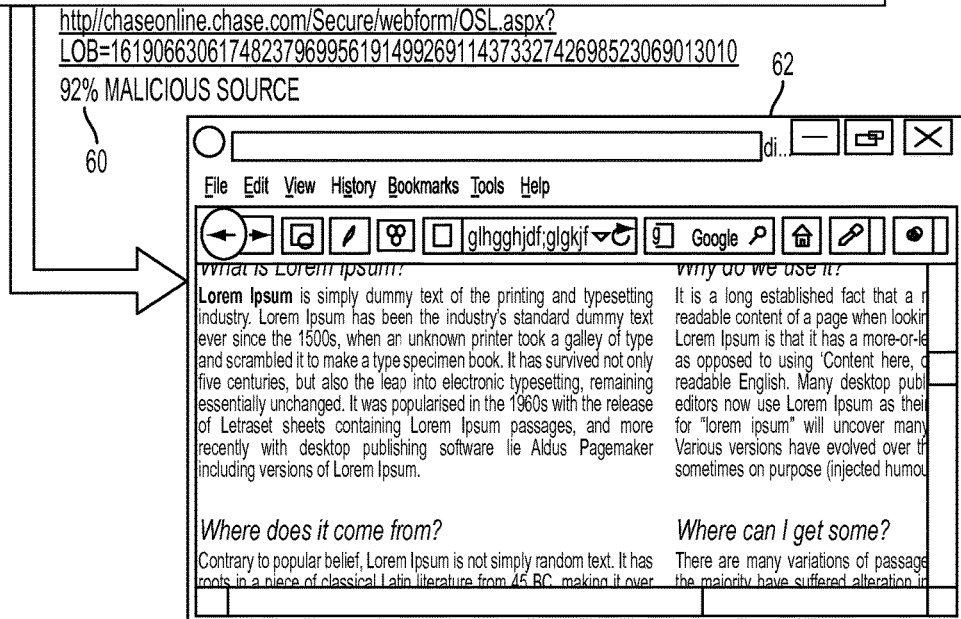
Figure 7:
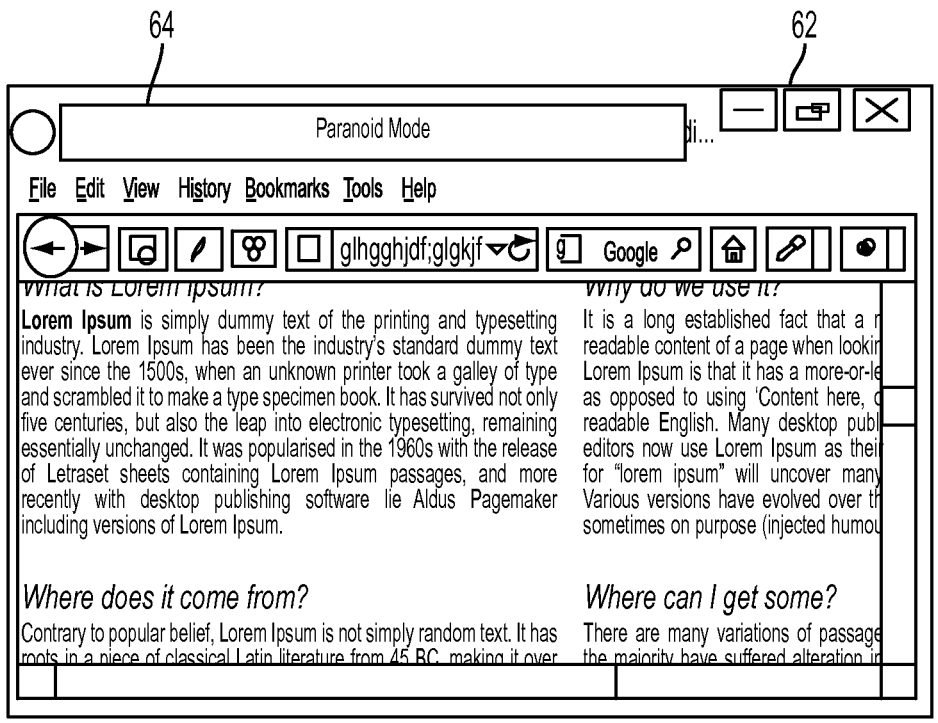

FIGS. 5-7 illustrate an embodiment in which an email client is the first or initial application and a web browser is the second or receiving application. FIG. 5 shows a screen print of an email client displaying a user's inbox 50. The user selects one message 52 (shown in a rectangular box) and the contents of this message are displayed 54. The displayed message contains a link 56 and instructions to access a particular Form by clicking on the link. Note that the selected email is classified as potentially risky. This is displayed via the email client interface as a risk assessment indicator 58. Hence, this email has triggered, in the email client (initial application), a suspicion that the data (this email) may have a risk. Typically email clients have the capability to classify a risk level and/or confidence level for emails; this can be done using algorithms, heuristics and/or in accordance with rules set by each email user.

FIG. 6 shows the information (the link 56 shown in FIG. 5) and a risk assessment percentage 60 of "92% malicious source" passed to the web browser (receiving application).

In one embodiment, this risk assessment indicates that the initial application knows that the information being sent is an infected email, and that anything in the information can be assumed to be malicious to the user's environment. A screen print 62 shows the content displayed by the web browser when it opens the link 56 received from the email client.

FIG. 7 shows the screen print 62 with an indicator "Paranoid Mode" 64 which shows the user that the receiving application is operating in paranoid mode. This indicates that the receiving application receives and evaluates the risk assessment percentage 60, and takes action in accordance with the protocol of the receiving application. Receiving application protocols can include, for example, running in sandbox mode, running in paranoid mode, quarantining, running without restrictions, and such protocols are determined in response to the risk assessment percentage. In this non-limiting example, the receiving application protocol for a risk assessment percentage 60 of 92% can be to run the receiving application in paranoid mode, and the receiving application chooses to display the web site with a warning. In another embodiment, the web site may not be displayed, or other action may be taken.

In one embodiment, both the first application and the second application reside on a mobile device. Alternatively, the first application can reside on a first device and the second application can reside on a second device and the devices can communicate via the internet or via a local area network. In one aspect, the first application, e.g., an email client, and the second application, e.g., a web browser, can be run using the same browser application.

An exemplary embodiment is presented. A first application of an email client evaluates email and flags or marks malicious email on a mail server, and places this malicious email in a user's junk/spam email folder. The user, inadvertently or mistakenly, decides to open an email from the junk/spam folder and to view a PDF attachment in the email. The first application (email client) knows that this email is junk (and potentially malicious), and that its contents are garbage. When the user attempts to view the PDF attachment in the junk email, the email client passes not only the PDF attachment but also the level of risk value, or risk assessment, to a second application, e.g., Adobe® PDF Viewer. The level of risk is passed along with the data. Based on this risk assessment received by the second application, it sandboxes the operation of viewing the file containing the data which was passed.

The inventive system and method enables a receiving application to take advantage of risk analysis performed by an upstream application which provides data to the receiving application. Not only does this simplify the processing at the receiving application, it also decreased the spread of malware and/or malicious data because the upstream application may be in a better position to determine malware than the receiving application.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more tangible computer readable medium(s) having computer readable program code embodied thereon.

Any combination of one or more computer readable medium(s) may be utilized. The tangible computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with a system, apparatus, or device running an instruction.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with a system, apparatus, or device running an instruction.

Program code embodied on a computer readable medium may be transmitted using any appropriate medium, including but not limited to wireless, wireline, optical fiber cable, RF, etc., or any suitable combination of the foregoing. The computer readable medium excludes only a propagating signal.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may run entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which run via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more operable instructions for implementing the specified logical function(s). It should also be noted that, in some alternative implementations, the functions noted in the block may occur out of the order noted in the figures. For example, two blocks shown in succession may, in fact, be run substantially concurrently, or the blocks may sometimes be run in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

What is claimed is:

1. A method for sharing data and a risk assessment of the data comprises: receiving access data in a first application, the access data requiring opening a second application to access second data, one or both of the first and second applications residing on a distributed computing network;
   determining by the first application a risk level of the second data in response to receiving the access data requiring opening a second application to access the second data, the risk level being determined prior to performing an action in the first application necessitating passing a message to the second application to access the second data;
   performing an action in the first application necessitating passing a message comprising at least the access data and the risk level determined by the first application to the second application;
   passing the message from the first application to the second application;
   receiving, at the second application, the message;
   determining by said second application whether the risk level determined by the first application exceeds a predetermined threshold;
   when the risk level exceeds the predetermined threshold, implementing a protocol to perform actions in the second application, said actions comprising at least using the access data in accordance with the protocol; and when the risk level does not exceed the predetermined threshold, running the second application using the access data without using the protocol to obtain the second data, wherein a programmed processor performs one or more of performing an action in the first application, determining the risk level, performing actions in the second application, and running the second application.

2. The method according to claim 1, wherein the first application is an email client and performing an action necessitating passing a message is clicking a URL in a selected email message.

3. The method according to claim 1, wherein implementing a protocol to perform actions in the second application comprises displaying an error message and terminating the second application.

4. The method according to claim 1, wherein implementing a protocol to perform actions in the second application comprises limiting functionality of the second application and running the second application.

5. The method according to claim 4, wherein limiting functionality of the second application comprises one or more of disabling Java scripts, preventing file downloading, preventing caching, implementing sandbox mode, implementing paranoid mode, and quarantining.

6. A system for sharing data and a risk assessment of the data, the system comprising:
  a memory device; and
  a hardware processor coupled to the memory device, the processor configured to:
    receive access data in a first application, the access data requiring opening a second application to access second data, one or both of the first and second applications residing on a distributed computing network;
    determine by the first application a risk level of the second data in response to receiving the data requiring opening a second application to access the second data, the risk level being determined prior to performing an action in the first application necessitating passing a message to the second application to access the second data;
    perform an action in the first application necessitating passing a message comprising at least the access data and the risk level determined by the first application to the second application;
    pass the message from the first application to the second application;
    receive, at the second application, the message;
    determine, using the second application, whether the risk level determined by the first application exceeds a predetermined threshold;
    when the risk level exceeds the predetermined threshold, implement a protocol to perform actions in accordance with the protocol; and
    when the risk assessment does not exceed the predetermined threshold, run the second application using the access data without using the protocol to obtain the second data,
  wherein the hardware processor performs one or more of performing an action in the first application, determining the risk level, performing actions in the second application, and running the second application.

7. The system according to claim 6, wherein the first application is an email client and performing an action necessitating passing a message is clicking a URL in a selected email message.

8. The system according to claim 6, wherein the second application is one of a web browser, an app store, a file viewer, a word processing program, a spreadsheet program, a presentation program, and an image viewer.

9. The system according to claim 6, wherein the actions performed comprise displaying an error message on a display device and terminating the second application.

10. The system according to claim 6, wherein the actions performed comprise limit functionality of the second application and run the second application.

11. The system according to claim 10, wherein limit functionality of the second application comprises one or more of disabling Java scripts, preventing file downloading, preventing caching, implementing sandbox mode, implementing paranoid mode, and quarantining.

12. The system according to claim 6, wherein the first and second applications reside on a mobile device.

13. A computer program product for using a multi-user operating system, the computer program product comprising a non-transitory storage medium readable by a processing circuit and storing instructions run by the processing circuit for performing method steps for sharing data and a risk assessment of the data comprises:
  receiving access data in a first application, the access data requiring opening a second application to access second data, one or both of the first and second applications residing on a distributed computing network;
  determining by the first application a risk level of the second data in response to receiving the access data requiring opening a second application to access the second data, the risk level being determined prior to performing an action in the first application necessitating passing a message to the second application to access the second data;
  performing an action necessitating passing a message comprising at least the access data and the risk level determined by the first application to the second application;
  passing the message from the first application to the second application;
  receiving the message at the second application;
  determining, using the second application, whether the risk level determined by the first application exceeds a predetermined threshold;
  when the risk assessment exceeds the predetermined threshold, implementing a protocol to perform actions in the second application, said actions comprising at least using the access data in accordance with the protocol; and
  when the risk assessment does not exceed the predetermined threshold, running the second application using the access data without using the protocol to obtain the second data,
  wherein the processing circuit performs one or more of performing an action in the first application, determining the risk level, performing actions in the second application, and running the second application.

14. The computer program product according to claim 13, wherein the first application is an email client and performing an action necessitating passing a message is clicking a URL in a selected email message.

15. The computer program product according to claim 13, wherein implementing a protocol to perform actions in the second application comprises displaying an error message and terminating the second application.

16. The computer program product according to claim 13, wherein implementing a protocol to perform actions in the second application comprises limiting functionality of the second application and running the second application with the limited functionality.

17. The computer program product according to claim 16, wherein limiting functionality of the second application comprises one or more of disabling Java scripts, preventing file downloading, preventing caching, implementing sandbox mode, implementing paranoid mode, and quarantining.

* * * * *